United States Patent
Forman

(10) Patent No.: US 8,794,834 B2
(45) Date of Patent: Aug. 5, 2014

(54) RECLOSABLE PACKAGING

(75) Inventor: Josephine Anne Forman, Pennsburg, PA (US)

(73) Assignee: Sealstrip Corporation, Gilbertsville, PA (US)

( * ) Notice: Subject to any disclaimer, the term of this patent is extended or adjusted under 35 U.S.C. 154(b) by 766 days.

(21) Appl. No.: 11/773,639

(22) Filed: Jul. 5, 2007

(65) Prior Publication Data

US 2008/0013869 A1    Jan. 17, 2008

Related U.S. Application Data

(63) Continuation-in-part of application No. 11/120,953, filed on May 4, 2005, now abandoned.

(51) Int. Cl.
*B65D 33/16* (2006.01)
*B65D 30/00* (2006.01)
*B65D 33/30* (2006.01)

(52) U.S. Cl.
USPC .......... 383/62; 383/2; 383/82; 383/89

(58) Field of Classification Search
USPC .......... 383/89, 90, 62, 71, 78, 81–83, 2; 428/40.1, 42.1, 42.2, 42.3, 343, 354, 428/411.1; 283/81; 229/300–306
See application file for complete search history.

(56) References Cited

U.S. PATENT DOCUMENTS

| | | | |
|---|---|---|---|
| 2,153,310 A * | 4/1939 | Newman | 24/17 R |
| 2,307,406 A * | 1/1943 | Howard | 156/199 |
| 3,241,662 A * | 3/1966 | Robinson et al. | 428/343 |
| 3,806,024 A | 4/1974 | Marchesani | |
| 4,055,249 A * | 10/1977 | Kojima | 206/447 |
| 4,082,873 A * | 4/1978 | Williams | 428/42.1 |
| 4,121,003 A * | 10/1978 | Williams | 428/42.1 |
| 4,722,166 A * | 2/1988 | Dieckow | 53/133.4 |
| 4,778,701 A * | 10/1988 | Pape et al. | 428/41.8 |
| 4,902,142 A * | 2/1990 | Lammert et al. | 383/78 |
| 4,907,825 A * | 3/1990 | Miles et al. | 281/51 |
| 4,927,278 A * | 5/1990 | Kuzuya et al. | 400/208 |
| 5,283,091 A * | 2/1994 | Darvell et al. | 428/41.6 |
| 5,351,426 A * | 10/1994 | Voy et al. | 40/638 |
| 5,409,753 A * | 4/1995 | Perez | 428/41.8 |
| 5,525,390 A * | 6/1996 | Yang | 428/41.6 |
| 5,676,785 A * | 10/1997 | Samonides | 156/244.11 |
| 5,707,482 A * | 1/1998 | Fusselman | 156/577 |
| 5,855,434 A | 1/1999 | Hagen | |
| 5,888,335 A | 3/1999 | Kobe et al. | |
| 5,928,749 A * | 7/1999 | Forman | 428/43 |
| 6,113,271 A | 9/2000 | Scott et al. | |
| 6,117,262 A * | 9/2000 | Moulds et al. | 156/212 |

(Continued)

FOREIGN PATENT DOCUMENTS

WO    2004035389    4/2004

*Primary Examiner* — Jes F Pascua
(74) *Attorney, Agent, or Firm* — Gregory J. Gore

(57) ABSTRACT

A package reclosing strip includes an adhesive layer that extends the full width of a flexible film strip. Formation of a dry edge on the strip, suitable for grasping by the user, is accomplished either by adhering a strip of material such as a dry tape or by the application of a liquid overcoating which chemically deadens the adhesive. The dry edge tape material is preferably made of mono-oriented polypropylene. The film strip is substantially transparent and includes graphics on the underside, beneath the adhesive coating. The graphics show through the film strip, providing visibility of the graphics from the outside.

6 Claims, 4 Drawing Sheets

(56) References Cited

U.S. PATENT DOCUMENTS

| | | | |
|---|---|---|---|
| 6,129,977 A * | 10/2000 | Riordan | 428/211.1 |
| 6,228,450 B1 * | 5/2001 | Pedrini | 428/40.1 |
| 6,277,227 B1 * | 8/2001 | Moulds et al. | 156/212 |
| 6,291,044 B1 * | 9/2001 | Chayka | 428/40.1 |
| 6,325,541 B1 | 12/2001 | Thrall et al. | |
| 6,436,500 B1 | 8/2002 | Yingst et al. | |
| 6,517,243 B2 * | 2/2003 | Huffer et al. | 383/88 |
| 6,541,089 B1 * | 4/2003 | Hamerski et al. | 428/40.1 |
| 6,663,932 B2 * | 12/2003 | McLaughlin et al. | 428/40.1 |
| 6,752,431 B1 | 6/2004 | Matthews et al. | |
| 7,165,888 B2 | 1/2007 | Rodick | |
| 7,223,015 B2 * | 5/2007 | Steffens | 383/5 |
| 7,673,909 B2 * | 3/2010 | Rousselet | 283/101 |
| 7,708,463 B2 * | 5/2010 | Sampaio Camacho | 383/62 |
| 2002/0168516 A1 | 11/2002 | Luhmann et al. | |
| 2003/0031836 A1 * | 2/2003 | Iwami et al. | 428/194 |

* cited by examiner

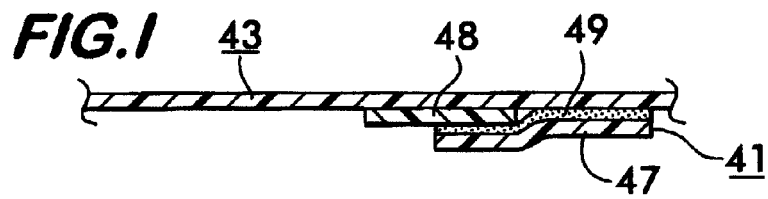
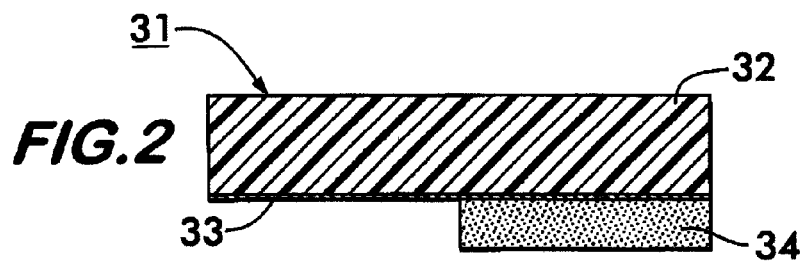
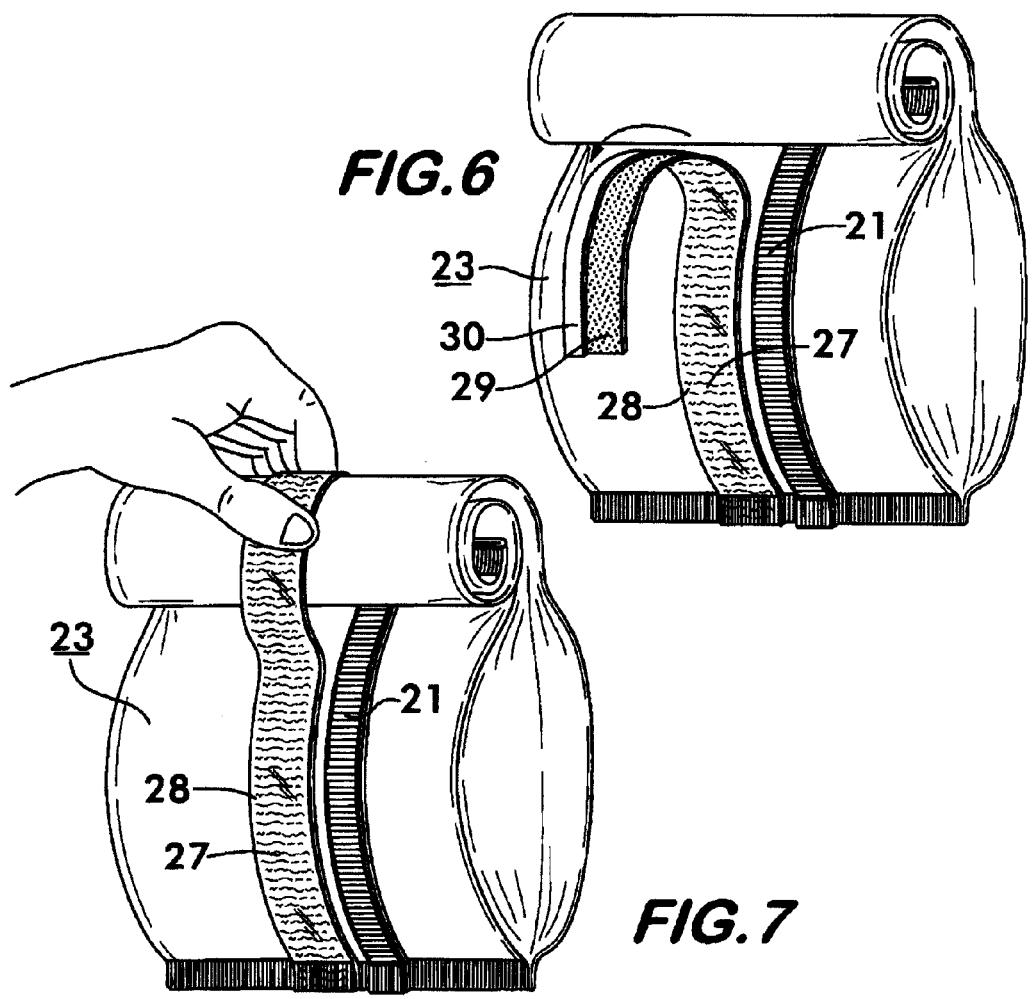

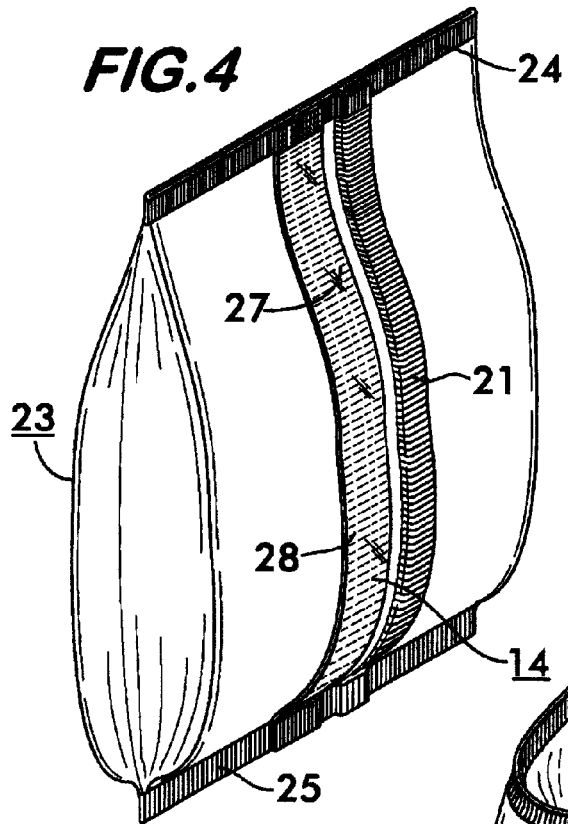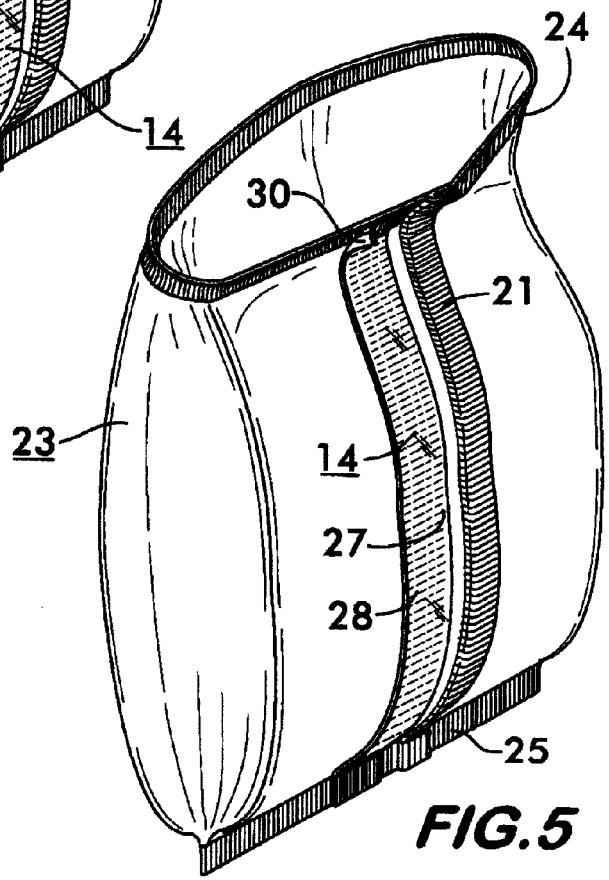

RECLOSABLE PACKAGING

RELATED APPLICATION

The present application is a continuation-in-part of co-pending U.S. application Ser. No. 11/120,953 entitled "Reclosable Packages", filed May 4, 2005 by the same inventor, priority from which is hereby claimed.

FIELD OF THE INVENTION

This invention relates to reclosable packages, and more particularly to flexible bag or pouch type packages typically, although not necessarily, for packaging food products, such as chips, nuts, raisins, crackers, and the like, in which the package contents are not consumed with one opening of the package and it is desired to reclose the package to store the remainder for subsequent use.

BACKGROUND OF THE INVENTION

Reclosable packages are becoming a progressively larger part of the packaged food market because of increasing consumer preference. It is likely that eventually all packaged consumables will be marketed in reclosable packages. In the past, there have been attempts to devise such reclosable packages, but such previous attempts exhibit major shortcomings. One such previous approach is disclosed in European Patent EP 1254846 assigned to Amcor Flexibles. This patent discloses a structure in which a tearstrip is formed from a marginal edge of the packaging film along the package longitudinal seal, the tearstrip functioning to hold the package reclosed as shown in the patent drawings. No more than 20% of packaging films are suitable for utilizing the disclosed structure. Moreover, this structure will not work on a two roll system that fabricates a four-side-seal package as there is no longitudinal fin or lap seal packaging material from which to form the tearstrip which, as shown in the patent, must be coextensive with and attached to the longitudinal package seal. The reclosable package according to the present invention is not so limited.

Additionally, the Amcor structure uses double-faced adhesive tape or hot melt adhesive in combination with the strip of packaging film to secure the tearstrip to the package. The double-faced tape utilizes a silicone coated release liner which must be disposed of during production. This is both expensive and inconvenient. Additionally, because most of the package films, particularly those such as double polypropylene laminate used for packaging food products, have low tear resistance, the reclosure strip can tear instead of detaching from the package. This requires that the double-faced tape used must have different adhesives on the two faces, a strong adhesive bonding to the reclosure strip and a weak adhesive bonding to the package film. This is expensive tape. Moreover, as shown in FIG. 4 of the Amcor drawings, the double-faced tape is widthwise coextensive with the packaging film tearstrip and results in a package reclosing strip that is very difficult to separate from the package for use because there is no dry edge that can be grasped. Hot melt adhesive applied on-line is messy, has slow start-up, and is problematic and expensive. The novel reclosure strip and package according to the present invention suffer from none of the foregoing defects.

The difficulties with the foregoing described structure were apparently recognized, and a modified structure devised which is disclosed in Amcor published PCT patent application WO 2004/035389. While this modified structure utilizes a double-faced adhesive tape that is narrower than the tearstrip to provide a dry edge for grasping, it still utilizes a reclosure strip that is obtained by cutting the strip off of the marginal edge of the packaging material and applying it to a double-faced adhesive-coated tape, as in the Amcor European Patent EP 1254846. This has several disadvantages. First, it retains the same disadvantages with regard to the double-faced tape as the Amcor European Patent EP 1254846, as previously noted. Equally important, if the packaging manufacturer must provide the same SKU product in two package forms, one being a reclosable package and the other not, two separate packaging films must be inventoried because of the difference in packaging film width and graphics. This is a substantial expense to the manufacturer but is a not uncommon requirement, because some customers want the reclosable feature and some do not want to pay for the extra packaging cost. Further, extensible films are widely used for packaging, and stretching during formation will cause wrinkles and curves. Again, the novel reclosure strips and packages according to the present invention do not suffer from these defects.

Another known type of reclosable package utilizes a stick-on label as a package reclosing device. Such labels have a number of disadvantages that render them generally unsatisfactory. First, the labels generally are short relative to the package length, must be removed before use and reset on the package after the open package top has been rolled down, and when removed become contaminated with skin oils and product dust which destroys the adhesive qualities and allows the package to come open. Second, the labels are supplied on a release liner, which must be disposed of after the labels are detached for use. Additionally, label application is expensive, requiring two label applicators per packaging line to insure that every package has a label. Moreover, label application is not positionally precise, which may interfere with visually desirable graphics on the package. Over all, label application is not a very desirable system.

In my previous patent application, Ser. 1No. 11/120,953, entitled "Reclosable Packages," I disclosed a two-part composite reclosable packaging strip as shown here in FIG. 1, wherein the film strip 48 is not itself adhered to the package 43 but is secured thereon by the single-faced tape 47 whose adhesive layer 49 adheres it to the package. The reclosing strip 41 is activated by grasping the film strip 48 and lifting or pivoting it outward. This permits grasping the reclosing strip 41 and pulling it downward to partially detach it from the package 43. A limitation of this construction is that printing applied to film strip 48 cannot extend the full width of the reclosing strip. This limitation is addressed in an alternate embodiment also disclosed in my previous patent application, shown herein in FIG. 2, which provides full-width graphics. As shown in FIG. 2, reclosing strip 31 consists of a film substrate 32 which may have graphics 33 printed thereon as shown. The strip is adhered to the packaging by a pressure sensitive adhesive layer 34. However, with this construction the graphics on the dry edge of the reclosing strip, that is the portion not covered by the adhesive 34 which attaches the strip to the package, are left unprotected and can wear off during use.

SUMMARY OF THE INVENTION

The reclosable package according to the present invention utilizes a novel reclosure strip which, unlike the Amcor structures, is made of materials independent of and different from the package material, and unlike the adhesive labels is of full package length. Furthermore, the reclosing strip according to the present invention includes a film strip which can accommodate graphics, which are protected, across the full width of the film strip.

In accordance with the present invention, an adhesive layer extends the full width of the flexible film strip. Formation of the dry edge of the strip suitable for grasping by the user is accomplished in either of two ways. In one embodiment, a strip of material, i.e. a dry tape, is applied onto the adhesive extending longitudinally along one edge of the film strip. The adhesive secures the tape to the film strip and provides a dry edge by forming an overlaying barrier between the user and the adhesive. In an alternate embodiment, the longitudinally extending barrier to the adhesive along one edge of the flexible film strip can be provided by the application of a liquid overcoating which chemically deadens the adhesive. The overcoating makes the film strip dry to the touch and easy to grasp by the fingers of the user.

The snack food industry alone accounts for thousands of millions of packages per year of pretzels, potato chips, corn chips, tortilla chips, candy bites, and other products. A large packager produces on the order of 3,000 million packages a year of these products, and the numerous smaller packagers produce on the order of 300 million packages a year. Cost analysis discloses that by using the reclosing strip according to the first embodiment of the invention, as compared to the Amcor structures, the cost savings to the smaller packager per year for 300 million packages is about 9 million dollars, and for the larger packager per year for 3,000 million packages is 90 million dollars, and that somewhat larger savings are effected by using the reclosing strip according to the second embodiment of the invention. These are not insignificant sums and will increase with an increasing market size.

The novel reclosure strip of the invention is not formed from the package material, so, as distinguished from Amcor, the packaging manufacturer need inventory only a single packaging film and can make packages with or without the reclosure strip. Instructional or other graphics can be printed on the dry-edge-forming film strip. No expensive double-faced tape or problematic hot melt adhesive system is required. No expensive production machinery, as required for Amcor and label application, is needed for production of packages according to the present invention, but only standard packaging machinery and an inexpensive standard tape unwind and applicator device. The reclosure strip is precisely laterally positionable anywhere along the running length of the package and avoids adhesive contamination because in use it is not detached from the package.

In comparison to the reclosing strip of my previous related patent application, the present reclosing strip is easy and inexpensive to manufacture while providing protection for full-width printed graphics.

Accordingly, it is a primary object of the invention to provide a novel reclosable package utilizing a novel package-reclosure strip.

Another object of the invention is to provide a novel package-reclosure strip which in one embodiment comprises the combination of a film strip furnishing a dry edge for grasping by adhering a dry tape barrier for a portion of the film strip, which is adhesively coated.

An additional object of the invention is to provide a novel package-reclosure strip which in the second embodiment comprises a liquid overcoating on a portion of an adhesive coating on the film substrate onto its full length.

A further object of the invention is to provide a novel package-reclosure strip as aforesaid, with instructional or other graphics printed across the full width of the reclosure strip.

Still another object of the invention is to provide a novel package and package-reclosure strip as aforesaid that requires no special manufacturing equipment but utilizes standard packaging machinery and an inexpensive tape unwind and applicator device.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIG. 1 is a cross-sectional view of the package reclosing strip according to my previous invention.

FIG. 2 is a cross-sectional view of an alternate package reclosing strip according to my previous invention.

FIG. 4 is a perspective view of a flexible package such as could be made with the apparatus of FIG. 3, with the package reclosing strip according to the invention shown thereon.

FIG. 5 is a showing of the package of FIG. 4 which has been opened to remove some of the packaged product.

FIG. 6 is a showing of the package of FIGS. 4 and 5 which has been opened and had product removed, and with the open package top partly rolled down, but with the partly detached reclosing strip not yet applied to the rolled down package top to hold it closed.

FIG. 7 is similar to FIG. 6 but with the reclosing strip applied to the rolled down package top to hold it closed.

In the several figures, like elements are designated by like reference characters.

DESCRIPTION OF THE PREFERRED EMBODIMENT

Figure 3:
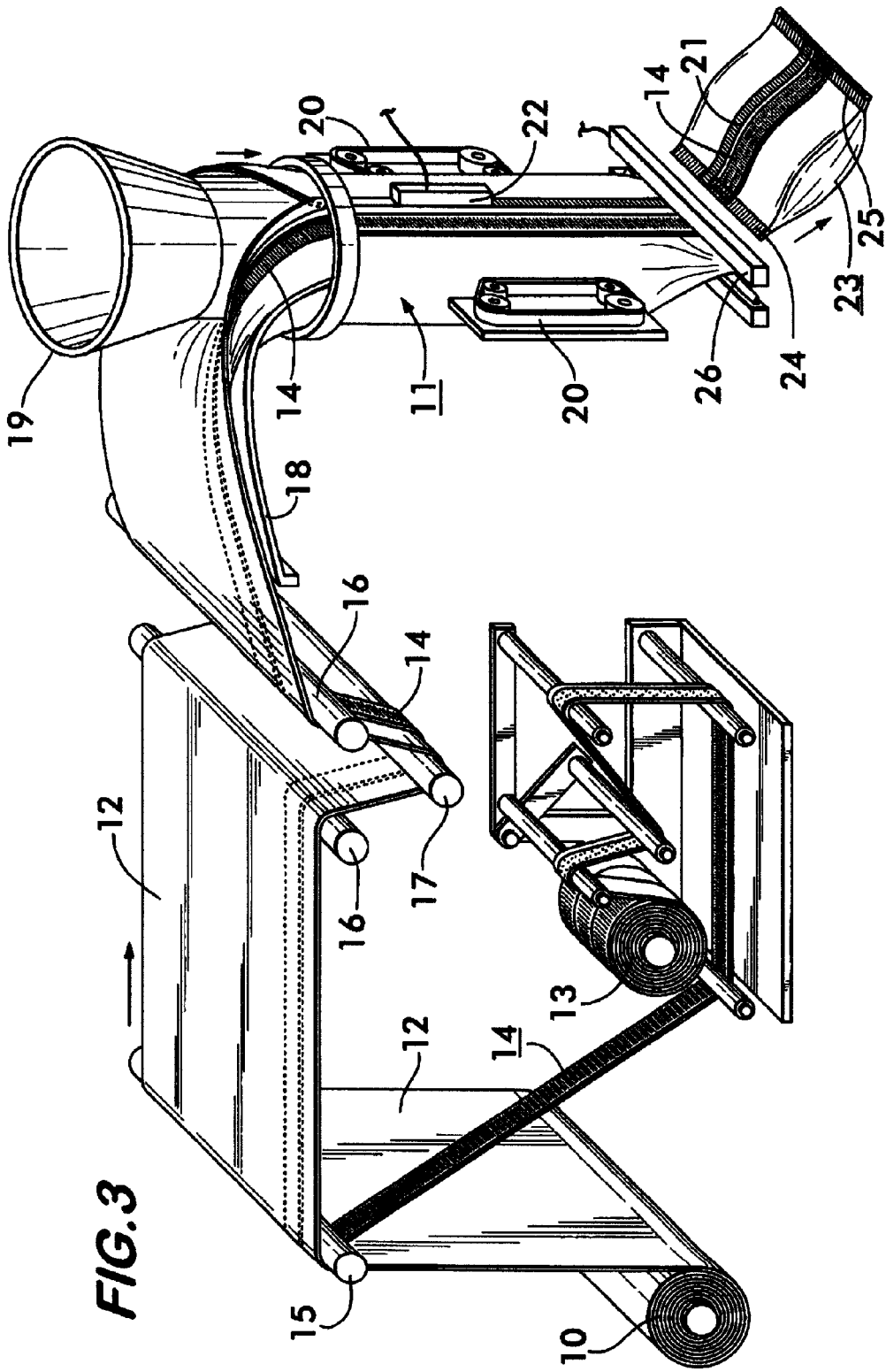
FIG. 3 is a diagrammatic showing of a vertical form fill and seal packaging machine together with the packaging film supply system and the reclosing tape applicator applying the reclosing tape to the packaging film.

Turning now to the apparatus shown in FIG. 3, there is seen a roll 10 of packaging film from which is pulled by the packaging machine 11 film drives 20 the web of packaging film 12. Simultaneously pulled from the tape unwinder and applicator supply roll 13 by the packaging machine 11 is the novel package reclosing strip 14 according to the invention, which is adhered to the film web 12 as the film web and reclosing strip pass around roller 15. The composite film web and reclosing strip en route to the packaging machine 11 pass around fixed position rollers 16 and dancer roller 17 which latter, in the known manner, automatically reciprocates vertically to adjustably provide the proper rate of web feed to the packaging machine.

The composite web is pulled over the packaging machine forming collar 18, wrapped around the product delivery tube 19 in the normal manner by the web pulling belt drives 20, and provided with a longitudinal seal 21 by the sealer 22. The finished package 23 exits the packaging machine 11 with the product sealed inside by the top seal 24 and bottom seal 25 formed by the sealer 26, and with the reclosing strip 14 adhered to the package and extending the full length of the package from top to bottom. The package may be of the type as shown in FIG. 3, or the gusseted type, or a pouch type, or four-sided seal package. The packaging machine 11 could, for example, be a Hayssen Vertical Form Fill and Seal machine, and the tape supply roll 13 could be spooled off of a Sealstrip Model D560 Tape Dispenser.

FIG. 4 shows a package 23 such as may be produced by the packaging machine 11 of FIG. 3, having top and bottom seals 24 and 25, a longitudinal seal 21, and with the package reclosing strip 14 adhered to the package and extending from the package top seal 24 to its bottom seal 25. As seen in FIGS. 4 through 7, the package reclosing strip 14 is a composite strip formed from a single faced adhesive coated flexible film strip 28 and a dry tape 30. Graphics 27 printed on the underside of the transparent film strip are visible from the top side. The dry tape 30 is longitudinally coextensive with and adhered to a lateral portion of the film strip by the adhesive coating 29. The dry tape 30 could be a substrate from one of the group of bi-axially oriented polypropylene, mono-axially oriented polypropylene, polyvinylchloride, and polyester, within the thickness range between 0.8 mil and 4.0 mils. The film strip 28 could be single- or multiple-layer bi-axially oriented polypropylene or high density polyethylene within the thickness range of 1.0 mil to 2.5 mils, typically 1.7 mils, or polyester in the thickness range of 1 to 2 mils, coated with a pressure sensitive adhesive of the group of rubber solvent, acrylic solvent, acrylic emulsion, and hot melt in the thickness range of 0.5 mil to 2.0 mils in coat weight.

Referring now to FIG. 5, the reclosing strip is activated by grasping the film strip 28 by the dry tape 30 and lifting or pivoting it outward. As shown, the package has been opened and some contents removed. As shown in FIG. 6, the construction of the invention facilitates grasping the reclosing strip 14 and pulling it downward to partially detach it from the package 23, which is then rolled down as shown. The detached section of the reclosing strip 14 is then laid over and detachably sealed to the rolled down package top as shown in FIG. 7. The next time that it is desired to remove some of the contents from the package, the reclosing strip is peeled down so that the package top may be unrolled for dispensing product, and the same reclosing process is then again performed. In this embodiment of the invention the film strip 28 could typically be about one-half inch wide, with the single-faced adhesive coated tape 27 being about three-quarters of an inch wide with about one-quarter-inch widthwise overlap of the tape onto the film strip to provide a composite reclosing strip 14 of about one inch in width.

Figure 8:
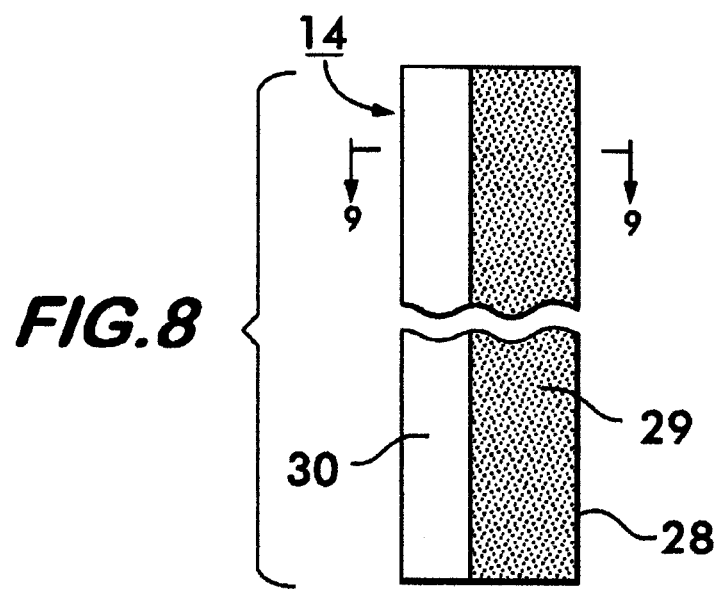
FIG. 8 is a top plan view of the package reclosing strip according to the present invention.

Referring now to FIG. 8, construction of the reclosable strip 14 of the invention is shown. The film strip 28 is adhered to the package and secured thereon by adhesive layer 29, which also affixes dry edge tape 30. The adhesive coating 29 extends the full width of the strip, as more clearly depicted in FIG. 9.

Figure 9:
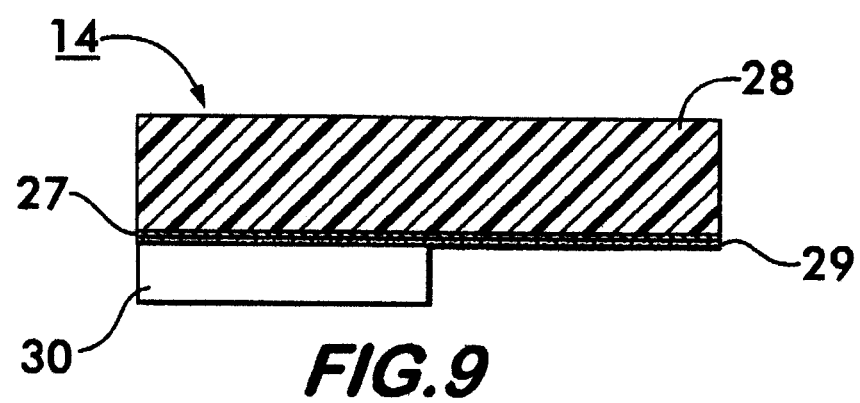
FIG. 9 is a cross section through the reclosing strip of FIG. 8, as will be seen viewed along lines 9-9 on FIG. 8.

Referring now to FIG. 9, the film strip 28 includes graphics 27 that show through the film strip 28, which in this embodiment is substantially transparent, providing visibility of the graphics from the outside as shown in FIGS. 4-7. On top of the printing, the next layer is the adhesive coating 29, which provides a protective barrier and a means to adhere tape 30. The adhesive portion of the strip not covered by the tape secures the strip to the package, while the tape provides a dry edge suitable for grasping by the user. In an alternate form of the invention, tape 30 may be replaced by a liquid coating which chemically deadens the tackiness of the adhesive coating, rendering it dry to the touch. In either case, the printed graphics are protected against frictional wear in the area of the dry edge. Compared to the construction described in my previous patent application, shown here in FIG. 2, the present embodiments heretofore described provide the advantage of ease of manufacture while providing protection for the printed graphics.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. The combination of a package and a composite package-reclosing strip detachably secured to said package for closing the package to a reduced size after it has been opened and some of the contents removed, comprising,
    (a) a variable size package formed from a web of flexible packaging material, comprising a closed package body having height and width, and having opposite ends with end seals defining the package height therebetween, and
    (b) a composite package-reclosing strip releasably affixed to the front of said package and progressively reattachable to different points on the rear of the package to hold the package closed at selected reduced sizes, comprising in combination,
        (1) an adhesively coated film strip extending fully longitudinally the height of said package between said package opposite ends;
        (2) a structurally separate flexible dry tape, longitudinally coextensive with and while operative for grasping by the user is non-releasably adhered to a lateral portion of said film strip by the adhesive coating, an adhesive-coated longitudinally extending portion of said film strip not covered by said tape being usable for securing said film strip to said package, said tape providing a dry edge for grasping by the user to pull the secured film strip away from the package and to reattach it to hold the package closed; and
        (3) ink printed graphics coextensive with the width of said film strip, said graphics applied to said film strip and located between said film strip and said adhesive wherein said film strip is transparent and said graphics are viewable from outside of said film strip, said adhesive providing a barrier to protect all of said graphics from frictional wear due to repeated use of the adhesive.

2. The combination as set forth in claim 1 wherein said flexible film strip is of substantially fixed width.

3. The combination as set forth in claim 1 wherein said flexible film strip is one of the group of transparent single or multiple layer bi-axially oriented polypropylene, high density polyethylene, and polyester.

4. The combination as set forth in claim 1 wherein said flexible film strip is within the thickness range of between 1.0 mil to 2.5 mils.

5. The combination of claim 1 wherein a detached section of said strip is laid over and sealed to a rolled down package top.

6. The combination of claim 1 wherein the strip extends the full length of the package from top to bottom.

\* \* \* \* \*